United States Patent [19]

Hofmann

[11] 4,193,304

[45] Mar. 18, 1980

[54] METHODS OF AND APPARATUS FOR BALANCING A ROTOR

[75] Inventor: Dionys Hofmann, Darmstadt, Fed. Rep. of Germany

[73] Assignee: Gebr. Hofmann, G.m.b.H. & Co. KG, Maschinenfabrik, Darmstadt, Fed. Rep. of Germany

[21] Appl. No.: 932,296

[22] Filed: Aug. 8, 1978

[30] Foreign Application Priority Data

Aug. 19, 1977 [DE] Fed. Rep. of Germany ....... 2737524

[51] Int. Cl.² ............................................. G01M 1/16
[52] U.S. Cl. ........................................ 73/462; 364/582
[58] Field of Search .................... 73/462–465; 364/463, 582

[56] References Cited

U.S. PATENT DOCUMENTS

| | | | |
|---|---|---|---|
| 3,608,381 | 9/1971 | Hines | 73/462 |
| 3,741,016 | 6/1973 | Hofmann | 73/462 |
| 4,085,619 | 4/1978 | Shapiro et al. | 73/462 |

FOREIGN PATENT DOCUMENTS

| | | |
|---|---|---|
| 1947090 | 10/1974 | Fed. Rep. of Germany . |
| 1340945 | 10/1972 | United Kingdom ....... 73/462 |

*Primary Examiner*—Jerry W. Myracle
*Attorney, Agent, or Firm*—Cushman, Darby & Cushman

[57] ABSTRACT

A method and apparatus for balancing a rotor such as the rim of a vehicle. The device utilizes the rated dimensions of the rotor in determining the angular position and magnitude of the imbalance. Means are provided for correcting the rated dimensions of the rotor with correction values corresponding to the distance between the center of gravity of a counterweight utilized to correct the imbalance in the axial and/or radial direction from a measuring point on the rotor for which the rated value is indicated. Means are also provided for converting between units.

20 Claims, 2 Drawing Figures

METHODS OF AND APPARATUS FOR BALANCING A ROTOR

This invention relates to methods of and apparatus for balancing a rotor on which there is provided information as to the values of geometrical dimensions of the rotor or a rotor part.

The expression "rotor" as used herein means any rotatable body that may require balancing, for instance a vehicle wheel.

For balancing such a rotor in one plane or several planes, the values of the geometrical dimensions of the rotor or rotor part can be fed into an electronic measurement system in which imbalances, determined by transducers during a test run, are fed to a frame computer which determines the imbalance angular position and magnitude and thereby takes into account the geometrical dimensions of the rotor or rotor part.

In the case of standarized rotors such as, for example, vehicle wheels, and in particular vehicle wheel rims, the rotor carries information concerning the geometrical dimensions of the rotor or rotor part. In the case of rims for vehicle wheels the rim sizes, particularly for the mouth width and the measurement point diameter, are given in inches. However, it is now becoming conventional practice to give this information in millimeters as well as inches.

Generally, the information as to the geometrical dimensions does not coincide with those points at which counterweights can be fixed during balancing. For example, when balancing vehicle wheels the counterweights are fixed to the outside of the rim. Therefore the plane in which imbalance compensation is provided on the rim is axially displaced relative to the measurement positions used for the rim mouth width. The same also applies regarding the measurement point diameter because the measurement points used for this purpose on the rim are on a different radius than the counterweight to be fixed to the rim.

To this extent it is not possible, when balancing vehicle wheels, to use the information as to the geometrical dimensions (rated values) on the rim when calculating the angular position and magnitude of the imbalance in the frame computer. If these rated values, for example, the mouth width and measurement point diameter, were fed into the electronic measurement system, the frame computer would give incorrect values for the angular position and magnitude of the imbalance.

It is admittedly possible, with known balancing machines, to measure by means of length measuring devices the rotors to be balanced. The geometrical dimensions obtained may then be fed into the electronic measurement system. However, in general, this method must be performed manually by an operator and is relatively time-consuming.

German Offenlegungsschrift No. 2,001,972 discloses the use of an adjusting potentiometer when balancing vehicle wheels, by means of which the distance of the inner compensating plane from a fixed bearing point on the balancing machine can be automatically transmitted to the electronic measurement system. However, it is impossible in this balancing machine also to use geometrical dimensions concerning the mouth width and measurement point diameter provided on the rotor.

According to one aspect of the present invention, there is provided a method of balancing a rotor on which there is provided information as to values of geometrical dimensions of the rotor or a rotor part. For balancing in one plane or several planes, the values of the geometrical dimensions of the rotor or rotor part are fed into an electronic measurement system. Imbalances, determined by transducers during a test run, and the output of the electronic system are fed to a frame computer which determines the imbalance angular position and magnitude and thereby takes account of the geometrical dimensions of the rotor or rotor part, the values of the geometrical dimensions on the rotor or rotor part being fed in the form of absolute metric units or in absolute inch units into the electronic measurement system. Also, a device for converting between units is provided.

In a method embodying the invention and described hereinbelow, one can use, in the imbalance measurement, the geometrical dimensions (hereinafter also referred to as "rated values") given on the rotor or rotor part, which differ from the geometrical dimensions to be taken into consideration in the imbalance measurement in the frame computer.

Stored correction values may be utilized to alter the rated values. If the units of measurement of the stored correction values and the rated values differ from one another, prior to being subjected to the action of the correction values the rated values can be normalized to the units of the stored correction values. Thus, it is possible to feed the rated values in inches or metric units, for example millimeters, directly into the electronic measurement system.

If account must be taken of the distance of the rotor to be balanced from a fixed point of a balancing machine, for example, a support point for a holding shaft, a value corresponding to the distance between the rotor and the fixed point on the machine can be fed into the electronic measurement system and subjected to the action of a correction value prior to feeding into the frame computer, said correction value corresponding to the axial spacing between the center of gravity of a counterweight from the rotor part used as a measurement point in the distance measurement.

The correction values for the rated values of the rotor can also be fixed in such a way that they always correspond to the distance of the center of gravity of the counterweight in an axial or radial direction from the measured point or points on the rotor for which the rated value or values is or are given on the rotor.

When the rotor to be balanced is a vehicle wheel and the rated values are for the mouth width and the measured point diameter of the rim as given on the rim, then prior to the rated value arriving at the frame computer, the rated value for the mouth width can be subject to the action of a correction value corresponding to the axial spacing of the center of gravity of a counterweight from the inside of the rim mouth, and the rated value for the measurement point diameter can be subject to the action of a correction value corresponding to the radial spacing of the center of gravity of the counterweight from the rim part taken into consideration on giving the measurement point diameter.

In addition, when balancing a vehicle wheel, the value corresponding to the distance of the rim from the fixed point of the machine can be subject to the action of a correction value corresponding to the axial spacing of the center of gravity of the counterweight from the outer edge of the rim. Account is taken of the fact that the counterweight is arranged in a balancing plane (internal balancing plane) which does not coincide with the plane of the outer edge of the rim used in measuring the distance or spacing.

According to a second aspect of the invention there is provided apparatus for balancing a rotor on which there is provided information as to values of geometrical dimensions of the rotor or a rotor part, the apparatus comprising an electronic measurement system, means for feeding said values into the electronic measurement system in the form of absolute metric units or in absolute inch units, and means converting the units of the values, the electronic measurement system comprising a frame computer to which, in use, imbalances, detected by transducers during a test run, are fed and which, in use, determines the imbalance angular position and magnitude and thereby takes account of the geometrical dimensions of the rotor or rotor part, and the electronic measurement system further comprising leads by means of which the fed-in values corresponding to the geometrical dimensions on the rotor or rotor part are supplied to the frame computer and which are each connected to a respective one of a plurality of correction value stores in which the position of the center of gravity of a counterweight to be applied to the rotor is stored with respect to the rotor part in the radial and/or axial direction.

The leads can contain summating elements to which the correction value stores are connected. The leads can also have stores for the values of the geometrical dimensions (rated values) given on the rotor or rotor part. Furthermore, normalization computers can be connected between said stores and the connection points of the correction value stores to the leads, said normalization computers being operative to normalize the rated values present in the stores and the correction values stored in the correction value stores into common dimensional units. Thus, as stated hereinbefore, it is, for example, possible to feed directly into the measuring electronic system the rated values in inches or metric units present on the rotor or rotor part.

The apparatus preferably comprises at least one conversion storage means and the normalization computer can be controlled by the storage means, which preferably store selectable measuring units, e.g., metric units or inches. The conversion storage means can be used for activating the correction value storage means. If the same dimensional units are used for the rated values and the correction values, it is also possible to activate the correction value storage means of a correction keyboard.

When determining the angular position and magnitude and the imbalance in the frame computer, account is taken of the center of gravity of the imbalance weight or counterweight to be applied and it is possible to use in the imbalance measurement the rated value present on standardized rotors and which represent the geometrical parameters of the rotor. These values can, for example, be fed directly into the measurement system by means of a keyboard. This makes the work of the operating staff much easier.

The stored values in the correction storage means can be determined as a function of the rotor type. Thus, for example, in the case of a larger number of rim types, mean values can be calculated for the correction values so that the same stored correction values can be used for balancing vehicle wheels with different rim types by a method in accordance with the invention.

The invention can be used with virtually all standardized rotors which carry information as to the geometrical dimensions of the rotor parts. It is not necessary for these geometrical dimensions to apply only to those measured points on the motor to which counterweights can be fixed.

These and other objects and advantages of the invention will become more apparant and more readily appreciated from the following detailed description of the presently preferred exemplary embodiment of the invention taken in conjunction with the accompanying drawings, of which:

Figure 1:
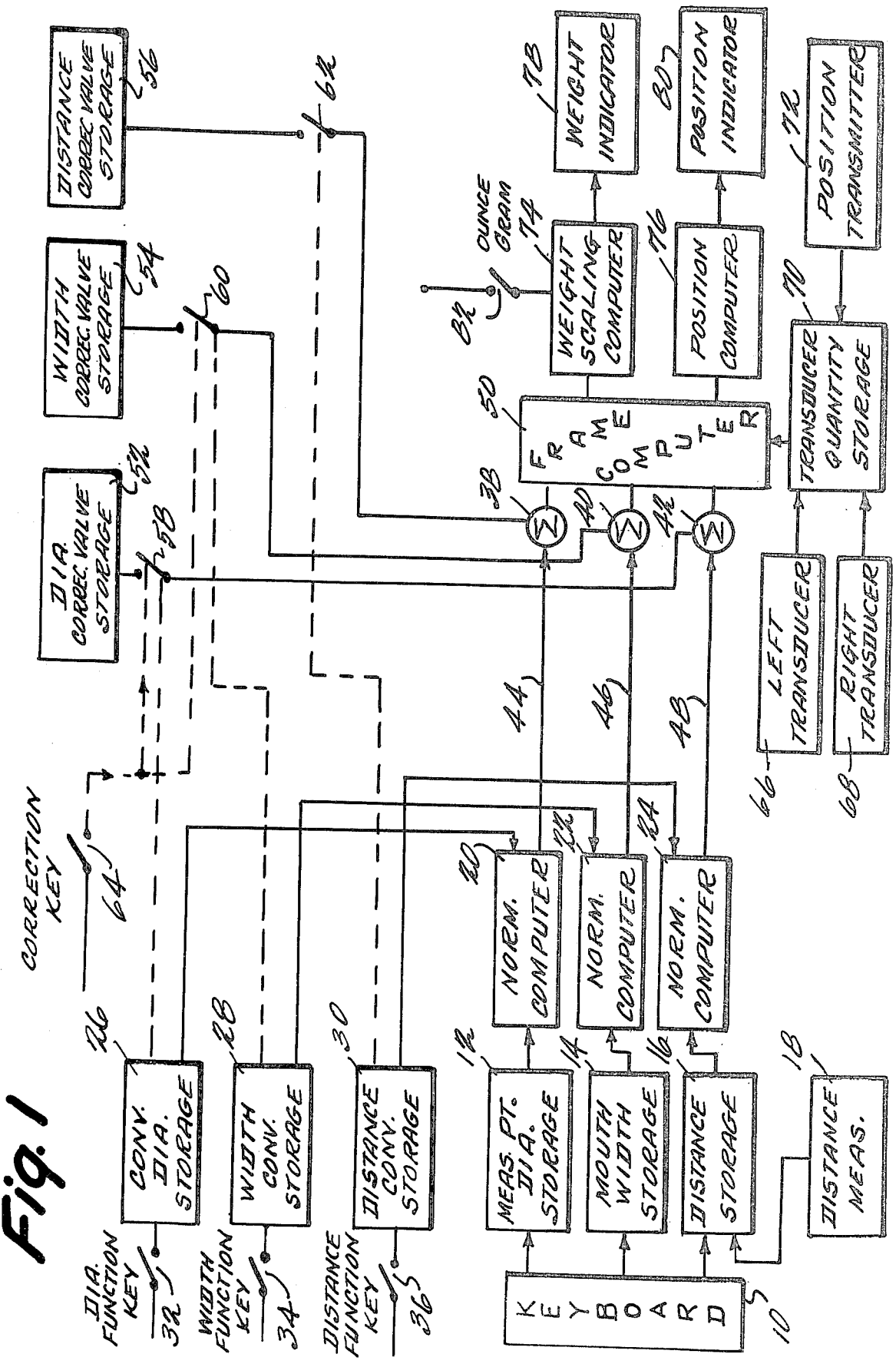
FIG. 1 is a block diagram of an embodiment of the invention.

FIG. 1 is a block diagram of an embodiment of the electronic measurement system of the present invention. The values of geometrical magnitudes or dimensions (rated values) provided on a rotor to be balanced can be fed into keyboard 10, to which are connected storage means 12 and 14 in which the fed-in rated values are stored. The rated values may, for example, be diameters or widths. When balancing a vehicle wheel, the values for the measurement point diameter and mouth width given on the wheel rim are stored in stores 12 and 14, respectively. Distance storage means 16 can be used for storing the distance of the rotor from a fixed point of a balancing machine, in particular a fixed support point. The distance value can be fed into distance storage means 16 either normally by means of keyboard 10 or automatically by means of a distance measuring device 18, a function key being provided to permit manual or automatic feeding in.

Normalization computers 20, 22 and 24 are connected to storage means 12, 14 and 16, respectively. The normalization computers 20, 22 and 24 are also controlled by diameter conversion storage means 26, width conversion storage means 28 and a distance conversion storage means 30. Conversion storage means 26, 28 and 30 store dimensional units, such as, for example, metric units or inches, which can be selected as a function of the dimensional units used for the rated values on the rotor. This selection can, for example, take place with the aid of diameter function key 32, width function key 34 and distance function key 36 in such a way that the keys are depressed once or several times depending on the dimensional unit to be selected.

Summating elements 38, 40 and 42 are connected, respectively, in leads 44, 46 and 48 that extend from normalization computers 20, 22 and 24, respectively, to a frame computer 50. Diameter, width and distance correction value storage means 52, 54 and 56 are connected to summating elements 38, 40 and 42, respectively. Correction value storage means 52, 54 and 56 can be activated by means of corresponding switches 58, 60 and 62 on switching conversion storage means 26, 28 and 30 from one unit to another unit. However, it is also possible to use correction key 64 for activating storage means 52, 54 and 56 if the rated values for the geometrical dimensions on the rotor to be balanced coincide with the correction value units in storage means 52, 54 and 56.

Values measured during a test run by transducers 66 (left) and 68 (right) are fed into frame computer 50 by transducer quantity storage means 70 connected to position transmitter 72. Frame computer 50 transmits values determined for the magnitude and angular position of the imbalance to weight scaling storage means or computer 74 and position storage means or computer 76 which are connected to corresponding weight and position indicating devices 78 and 80, respectively. For indicating weight, weight scaling storage means or computer 74 is provided with an ounce/gram change-over switch 82 in order to be able to indicate the imbalance magnitude in ounces or grams. Weight computer 74 produces the imbalance magnitude and position computer 76 produces the angular position of the imbalance. Weight indicating device 78 is used for weight indication and position indicating device 80 for position indication.

Figure 2:
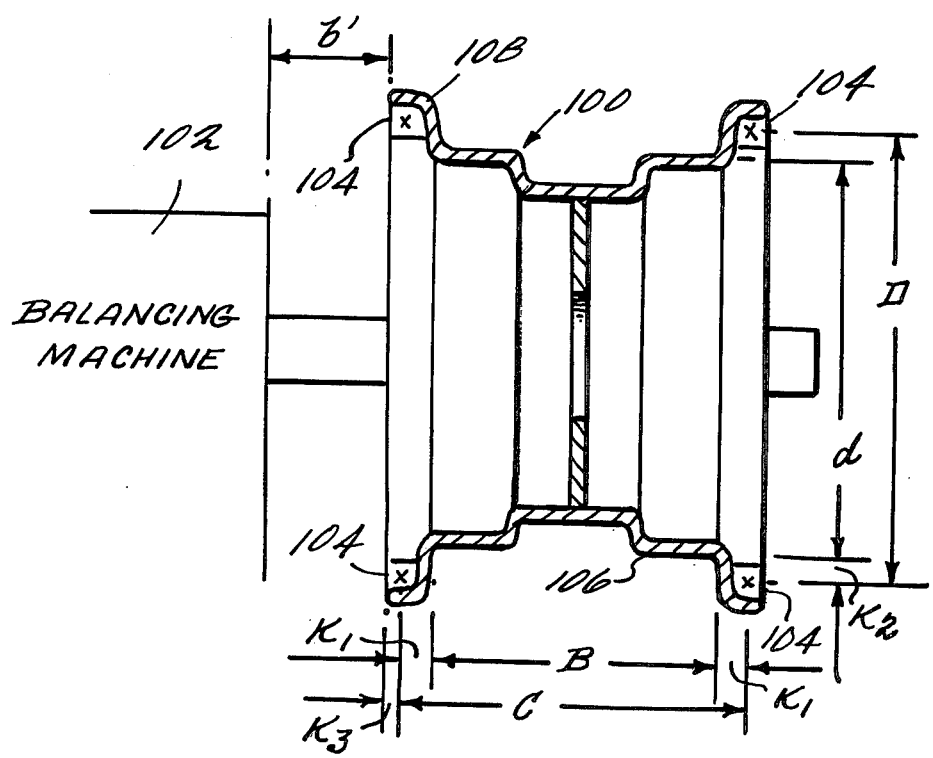
FIG. 2 is a section through a symmetrical drop-base vehicle wheel rim which is arranged at a distance from a balancing machine.

The preparation of the geometrical data supplied to frame computer 50 will now be explained with reference to FIG. 2, which shows a symmetrical drop base vehicle wheel rim 100. FIG. 2 does not show how rim 100 is fixed to the diagrammatically represented balancing machine 102. Fixing in fact takes place by means of any known clamping device. FIG. 2 contains only the information necessary for illustrating the invention.

The mouth width (designated B) and the measurement point diameter (designated d) are given on rim 100 in inches. In order to feed these rated values into the electronic measurement system shown in FIG. 1, width and diameter function keys 32 and 34 are firstly correspondingly operated so that inch units are selected from conversion storage means 26 and 28. The geometrical quantities given in inches on the rim for the mouth width B and the measurement point diameter d can then be fed into keyboard 10. These rated values are stored in storage means 12 and 14. Simultaneously on switching over conversion storage means 26 and 28, diameter and width correction value storage means 52 and 54 are activated by means of switches 58 and 60. In storage means 52 and 54 the correction values are given in metric units, for example millimeters. Diameter correction value storage means 52 contains a correction value $K_2$ which corresponds to the radial distance of the center of gravity of counterweight 104 from rim shoulder 106. Shoulder 106 is used as the measurement point when indicating the measurement point diameter for the represented type of rim.

Width correction value storage means 54 stores the distance $K_1$ of the center of gravity of the imbalance weight or counterweight 104 from the inside of the rim mouth or end flange. The inner surface of the rim mouth is used as the measurement point in indicating the mouth width.

In addition, the spacing b' of the outer edge of the rim mouth or end flange 108, to whose outside is fixed imbalance counterweight 104, can be fed into distance storage means 16 in inches by means of the keyboard or automatically by distance measuring device 18. The distance $K_3$ of the center of gravity of counterweight 104 from the outer edge of rim mouth 108 is stored in the correction value storage means 56. The correction values are stored in correction value storage means 52, 54 and 56 in metric units, for example, millimeters.

As already stated, the corresponding dimensional units for conversion in normalization computers 20, 22 and 24 can be selected by function keys 32, 34 and 36 in the corresponding conversion storage means 26, 28 and 30. The normalized values are supplied by leads 44, 46 and 48 to summating elements 38, 40 and 42 where they are summated with the correction values in storage means 52, 54 and 56. The summed values are fed into frame computer 50, the values being processed in such a way that they are used in determining the angular position and magnitude of imbalance. In the geometrical quantities supplied via leads 44, 46 and 48 to frame computer 50, account is taken of the difference of the center of gravity position of the counterweight relative to the geometrical quantities (rated values) given on the rim, so that the geometrical quantities given on the rim can be fed into keyboard 10.

Although only a few exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention as defined in the following claims.

What is claimed is:

1. A method of balancing a rotor on which geometric dimensions are provided in one or several planes, comprising the steps of:
    applying said geometric dimensions in the form of at least one of absolute metric units and absolute English units to an electronic measurement system;
    converting said geometric dimensions to predetermined units;
    producing a signal related to the imbalances in said rotor by means of transducers;
    correcting said geometric dimensions with correction values, said correction values compensating for the difference in position between the center of gravity of a counterweight applied during imbalance compensation and said geometric dimensions; and
    following the step of correcting, determining the imbalance angular position and magnitude of said imbalance from said signal and the corrected geometric dimensions.

2. A method as in claim 1, wherein said applying step applies said dimensions in inch units.

3. A method as in claim 1, wherein said correcting step occurs in response to operation of a key.

4. A method as in claim 1, wherein said converting step occurs in response to at least one depression of a function key.

5. A method as in claim 1, wherein said converting step includes the step of switching on or off a normalization computer.

6. A method as in claim 1, wherein said method further comprises the step of applying the distance between a fixed point of a balancing machine and a point associated with said rotor to said electronic measurement system, and said determining step determines the imbalance from said distance, said signal and said geometric dimensions.

7. A method as in claim 6, wherein said distance applying step occurs automatically by means of a distance measuring device.

8. A method as in claim 6, further comprising the step of correcting said distance with a correction value prior to said correcting step, said correction value being related to the axial distance between the center of gravity of a counterweight and a rotor part used as a measurement point of said distance.

9. A method according to claim 8, wherein said rotor is a vehicle wheel and wherein said method further comprises the step of correcting the value corresponding to said distance with a correction value prior to said determining step, said correction value compensating for the axial distance of the center of gravity of the counterweight from an outer edge of said rim.

10. A method as in claim 1, wherein said correcting step further comprises the step of summing said dimensions with said correction values.

11. A method as in claim 10, wherein said converting step converts said dimensions to the units of said correction value.

12. A method according to claim 1, wherein said rotor is a vehicle wheel and said geometric dimensions are the mouth width and the measuring point diameter as given on the rim, and wherein said method further comprises the step of correcting said geometric dimensions with correction values prior to said determining step, said correction value for said mouth width compensating for the axial distance of the center of gravity of a counterweight from the inside of the rim mouth, and said correction value for said measurement point diameter compensating for the radial distance of the center of gravity of the counterweight from the rim part taken into consideration when indicating the measurement point diameter.

13. Apparatus for balancing a rotor on which information is provided as to values of geometrical dimensions of the rotor, the apparatus comprising;
an electronic measurement system;
means for feeding said dimension into said system in the form of absolute metric or English units;
means for converting said dimensions to predetermined units;
transducers for detecting imbalances in said rotor during test runs;
a plurality of correction values storage means in which correction values corresponding to the position of the center of gravity of a counterweight to be applied to the rotor to correct an imbalance is stored with respect to the rotor in at least one of the radial and axial direction;
said system further comprising frame computer means to which said transducer outputs are applied for determining the imbalance angular position and magnitude, taking into account said dimensions of said rotor; and
said system further comprising leads for supplying to said frame computer means said dimensions and for supplying to said frame computer means the contents of said correction value storage means.

14. Apparatus according to claim 13, further comprising summating elements in said leads for summing said correction values and said dimensions.

15. Apparatus according to claim 13, wherein said leads include storage means for storing said geometrical dimensions of said rotor.

16. Apparatus according to claim 15, wherein said converting means comprise normalization computer means for normalizing to said predetermined units said dimensions and said correction values, said normalization computer means connected on said leads between said dimension storage means and said correction value storage means.

17. Apparatus according to claim 16, including at least one conversion storage means for storing selectable dimensional conversion units (e.g., metric units or inches) and being connected to said normalization computer means.

18. Apparatus according to any one of claims 13 to 17, further comprising a correction key for activating said correction value storage means.

19. Apparatus according to claim 18, wherein said correction value storage means can be activated by said converting means.

20. Apparatus according to claim 19, wherein each of said correction values correspond to the distance of the center of gravity of the counterweight in the axial and/or radial direction from a measuring point on the rotor for which the rated value is indicated on the rotor.

* * * * *